United States Patent
Doyle et al.

(10) Patent No.: US 7,370,098 B2
(45) Date of Patent: May 6, 2008

(54) AUTONOMIC MANAGEMENT OF AUTONOMIC SYSTEMS

(75) Inventors: Ronald P. Doyle, Raleigh, NC (US); David L. Kaminsky, Chapel Hill, NC (US); David M. Ogle, Cary, NC (US); Richard Dean Telford, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 981 days.

(21) Appl. No.: 10/635,878

(22) Filed: Aug. 6, 2003

(65) Prior Publication Data

US 2005/0044209 A1  Feb. 24, 2005

(51) Int. Cl.
G06F 15/173 (2006.01)
(52) U.S. Cl. .................................................... 709/223
(58) Field of Classification Search ................ 709/223
See application file for complete search history.

(56) References Cited

U.S. PATENT DOCUMENTS

| | | | |
|---|---|---|---|
| 5,717,865 A | 2/1998 | Stratmann .................... | 395/210 |
| 5,754,939 A * | 5/1998 | Herz et al. .................. | 455/3.04 |
| 5,893,083 A * | 4/1999 | Eshghi et al. ................. | 706/45 |
| 6,026,442 A * | 2/2000 | Lewis et al. .................. | 709/229 |
| 6,125,390 A * | 9/2000 | Touboul ....................... | 709/223 |
| 6,178,430 B1 | 1/2001 | Cohen et al. ................. | 707/501 |
| 6,233,449 B1 * | 5/2001 | Glitho et al. ................. | 455/423 |
| 6,330,546 B1 | 12/2001 | Gopinathan et al. .......... | 705/55 |
| 6,446,123 B1 * | 9/2002 | Ballantine et al. ........... | 709/224 |
| 6,856,942 B2 * | 2/2005 | Garnett et al. ............... | 702/183 |
| 2002/0062237 A1 | 5/2002 | Matsumoto et al. ........... | 705/7 |
| 2002/0138571 A1 | 9/2002 | Trinon et al. ................ | 709/204 |

(Continued)

FOREIGN PATENT DOCUMENTS

FR 2774191 A * 7/1999

OTHER PUBLICATIONS

Feridun, M.; Leib, M.; Nodine, M.; Ong, J.; "ANM: Automated Network Management System"; Mar. 1988; IEEE Network, vol. 2, No. 2; pp. 13-19.*

Cronk, Robert N.; Callahan, Paul H.; Bernstein, Lawrence; "Rule-Based Expert Systems for Network Management Operations: An Introduction"; Sep. 1988; IEEE Network; pp. 7-8, 13-21.*

(Continued)

*Primary Examiner*—Andrew Caldwell
*Assistant Examiner*—Christopher Biagini
(74) *Attorney, Agent, or Firm*—A. Bruce Clay, Esq.; Steven M. Greenberg, Esq.; Carey Rodriguez Greenberg & Paul LLP

(57) ABSTRACT

A method for the autonomic management of autonomic systems can include monitoring a managed system and recommending a course of action to be performed in the managed system. It can be determined whether the recommended course of action has been performed by an administrator. Responsive to the determination, it further can be determined whether an outcome from the course of action comports with a predicted outcome. If so, a point count can be changed responsive to a further determination that the outcome from the course of action comports with the predicted outcome. Conversely, the point count can be oppositely changed responsive to a further determination that the outcome from the course of action does not comports with the predicted outcome. In any case, when the point count crosses a threshold value, the management of the managed system can be transitioned to an adaptive component.

10 Claims, 4 Drawing Sheets

U.S. PATENT DOCUMENTS

| | | | |
|---|---|---|---|
| 2002/0174362 A1 | 11/2002 | Ullmann et al. | 713/201 |
| 2002/0184065 A1 | 12/2002 | Menard et al. | 705/7 |
| 2002/0184353 A1 | 12/2002 | Creamer et al. | 709/223 |
| 2002/0194045 A1 | 12/2002 | Shay et al. | 705/18 |
| 2002/0194326 A1 | 12/2002 | Gold et al. | 709/224 |
| 2005/0132052 A1* | 6/2005 | Uttamchandani et al. | 709/226 |
| 2006/0080014 A1* | 4/2006 | Di Palma et al. | 701/41 |
| 2006/0277591 A1* | 12/2006 | Arnold et al. | 726/1 |

OTHER PUBLICATIONS

Bieszczad, Andrzej; Pegurek, Bernard; White, Tony; "Mobile Agents for Network Management"; Sep. 1998; IEEE Communications Surveys; pp. 1-29.*

*Press Releases, IMB Press releases: IMB Unveils New autonomic Computing Deployment Model*, wysiwyg://13http://www-3.ibm.com/autonomic/press2.shtml, pp. 1-2, (Apr. 2003).

J. Schneider, *IBM Tivoli enterprise Solution*, IM Software Group, pp. 1-12http://www.tivoli.com.

* cited by examiner

AUTONOMIC MANAGEMENT OF AUTONOMIC SYSTEMS

BACKGROUND OF THE INVENTION

1. Statement of the Technical Field

The present invention relates to the field of systems administration and more particularly to the administration of an autonomic system.

2. Description of the Related Art

In the famed manifesto Paul Horn, *Autonomic Computing: IBM's Perspective on the State of Information Technology*, (IBM Corporation 2001)(hereinafter, the "Manifesto"), Paul Horn, Senior Vice President of IBM Research, observed, "It's not about keeping pace with Moore's Law, but rather dealing with the consequences of its decades-long reign." Given this observation, Horn suggested a computing parallel to the autonomic nervous system of the biological sciences. Namely, whereas the autonomic nervous system of a human being monitors, regulates, repairs and responds to changing conditions without any conscious effort on the part of the human being, in an autonomic computing system, the system must self-regulate, self-repair and respond to changing conditions, without requiring any conscious effort on the part of the computing system operator.

Thus, while the autonomic nervous system can relieve the human being from the burden of coping with complexity, so too can an autonomic computing system. Rather, the computing system itself can bear the responsibility of coping with its own complexity. The crux of the Manifesto relates to eight principal characteristics of an autonomic computing system:

I. The system must "know itself" and include those system components which also possess a system identify.

II. The system must be able to configure and reconfigure itself under varying and unpredictable conditions.

III. The system must never settle for the status quo and the system must always look for ways to optimize its workings.

IV. The system must be self-healing and capable of recovering from routine and extraordinary events that might cause some of its parts to malfunction.

V. The system must be an expert in self-protection.

VI. The system must know its environment and the context surrounding its activity, and act accordingly.

VII. The system must adhere to open standards.

VIII. The system must anticipate the optimized resources needed while keeping its complexity hidden from the user.

Importantly, in accordance with the eight tenants of autonomic computing, several single system and peer-to-peer systems have been proposed in which self-configuration, management and healing have provided a foundation for autonomic operation. Self-managing systems which comport with the principles of autonomic computing reduce the cost of owning and operating computing systems. Yet, implementing a purely autonomic system has proven revolutionary. Rather, as best expressed in the IBM Corporation white paper, Autonomic Computing Concepts (IBM Corporation 2001)(hereinafter, the "IBM White Paper"), "Delivering system wide autonomic environments is an evolutionary process enabled by technology, but it is ultimately implemented by each enterprise through the adoption of these technologies and supporting processes."

In the IBM White Paper, five levels have been logically identified for the path to autonomic computing. These five levels range from the most basic, manual process to the most purely autonomic. In further illustration, FIG. 1 is a block illustration of the five levels of the path to autonomic computing. The Basic Level 110 represents a starting point of information technology environments. Each infrastructure element can be managed independently by an administrator who can establish, configure, monitor and ultimately replace the element. At the Managed Level 120, systems management technologies can be used to collect information from disparate systems onto fewer consoles, reducing the time consumed for the administrator to collect and synthesize information as the environment becomes more complex.

Notably, the Predictive Level 130 incorporates new technologies to provide a correlation among several infrastructure elements. These infrastructure elements can begin to recognize patterns, predict the optimal configuration of the system, and provide advice as to the nature of the course of action which the administrator ought to take. By comparison, at the Adaptive Level 140 the system itself can automatically perform appropriate actions responsive to the information collected by the system and the knowledge of the state of the system. Finally, at the Autonomic Level 150 the entire information technology infrastructure operation is governed by business policies and objectives. Users interact with the autonomic technology only to monitor the business processes, alter the objects, or both.

Between each of the levels 110, 120, 130, 140, 150 of computing management, thresholds 105, 115, 125, 135 exist. The transition from the Basic Level 110 through to the Autonomic Level 150 necessarily crosses each threshold 105, 115, 125, 135 as the management principles vary from manual characteristics 170 through to autonomic characteristics 180. Yet, the mechanism for automatically transitioning from one level to the next has not been defined. In fact, often the level corresponding to a management configuration often is fixed from the start and cannot be varied without substantial human intervention and reconfiguration. Certainly, the determination of when to transition from the Predictive Level 130 to the Adaptive Level 140 has not been defined. Nevertheless, it will be apparent to the skilled artisan that the primary difference between the Predictive Level 130 and the Adaptive Level is one of trust in the system's ability to manage its responsible elements without human intervention.

SUMMARY OF THE INVENTION

The present invention addresses the deficiencies of the art in respect to the autonomic management of a system and provides a novel and non-obvious method, system and apparatus for the autonomic management of autonomic systems. For instance, in a preferred aspect of the present invention, the system can include a manual management process and an autonomic management process. Each of the manual and autonomic management processes can have a configuration for recommending courses of action responsive to monitoring the operation of a managed system. A data structure further can be coupled to the manual and autonomic management processes and configured for storing a point count reflecting a level of trust of decision making by the manual and autonomic management processes. Finally, a transition process can be coupled to the data structure and programmed to empower a selected one of the manual and autonomic management process to manage the managed system based upon the data structure containing a point count which exceeds a threshold value.

By comparison, a method for the autonomic management of autonomic systems can include monitoring a managed system and recommending a course of action to be performed in the managed system. It can be determined whether the recommended course of action has been performed by an administrator. Responsive to the determination, it further can be determined whether an outcome from the course of action comports with a predicted outcome. If so, a point count can be changed responsive to a further determination that the outcome from the course of action comports with the predicted outcome. Conversely, the point count can be oppositely changed responsive to a further determination that the outcome from the course of action does not comport with the predicted outcome. In any case, when the point count crosses a threshold value, the management of the managed system can be transitioned to an adaptive component. Similarly, when the point count re-crosses the threshold value in a direction opposite a direction which gave rise to the transitioning step, management of the managed system can be returned to a predictive component. Hysteresis can be applied to eliminate overly frequent transitions.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a system, method and apparatus for autonomically transitioning between a manual and an autonomic management scheme in an autonomic system. The manual management scheme can entail the management of the system by an administrator in consultation with the recommendations of a predictive management process. The autonomic management scheme, by comparison, can entail the management of the system by an adaptive management process configured to act upon the course of action predicted by the process itself. The transition from manual to autonomic management can be effectuated upon building a level of trust in the predictive capabilities of the predictive management process. Conversely, the transition from autonomic to manual management can be effectuated upon building a level of distrust in the predictive capabilities of the autonomic management process.

Figure 1:
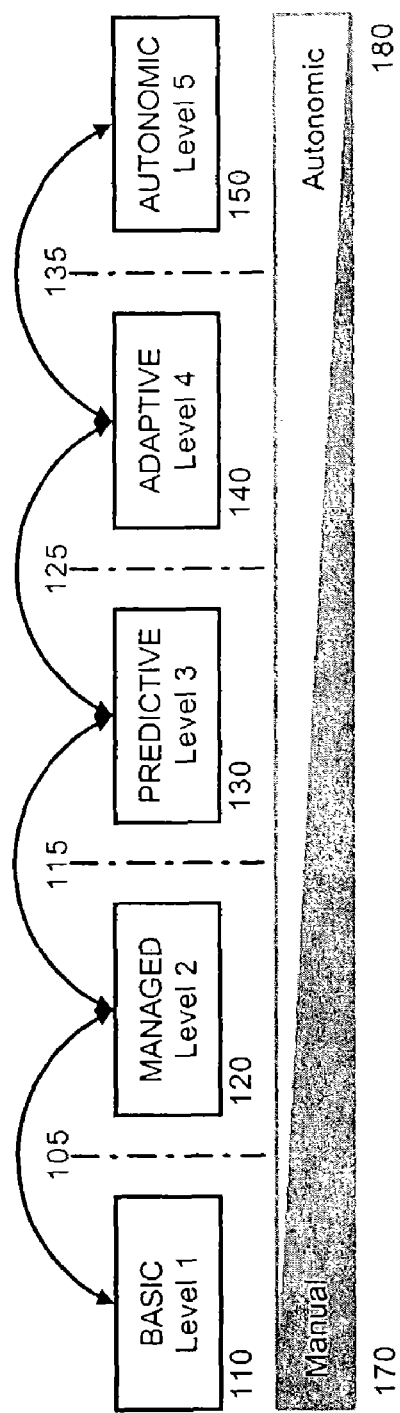
FIG. 1 is a block illustration of five levels of autonomic computing defined within the art.
Figure 2:
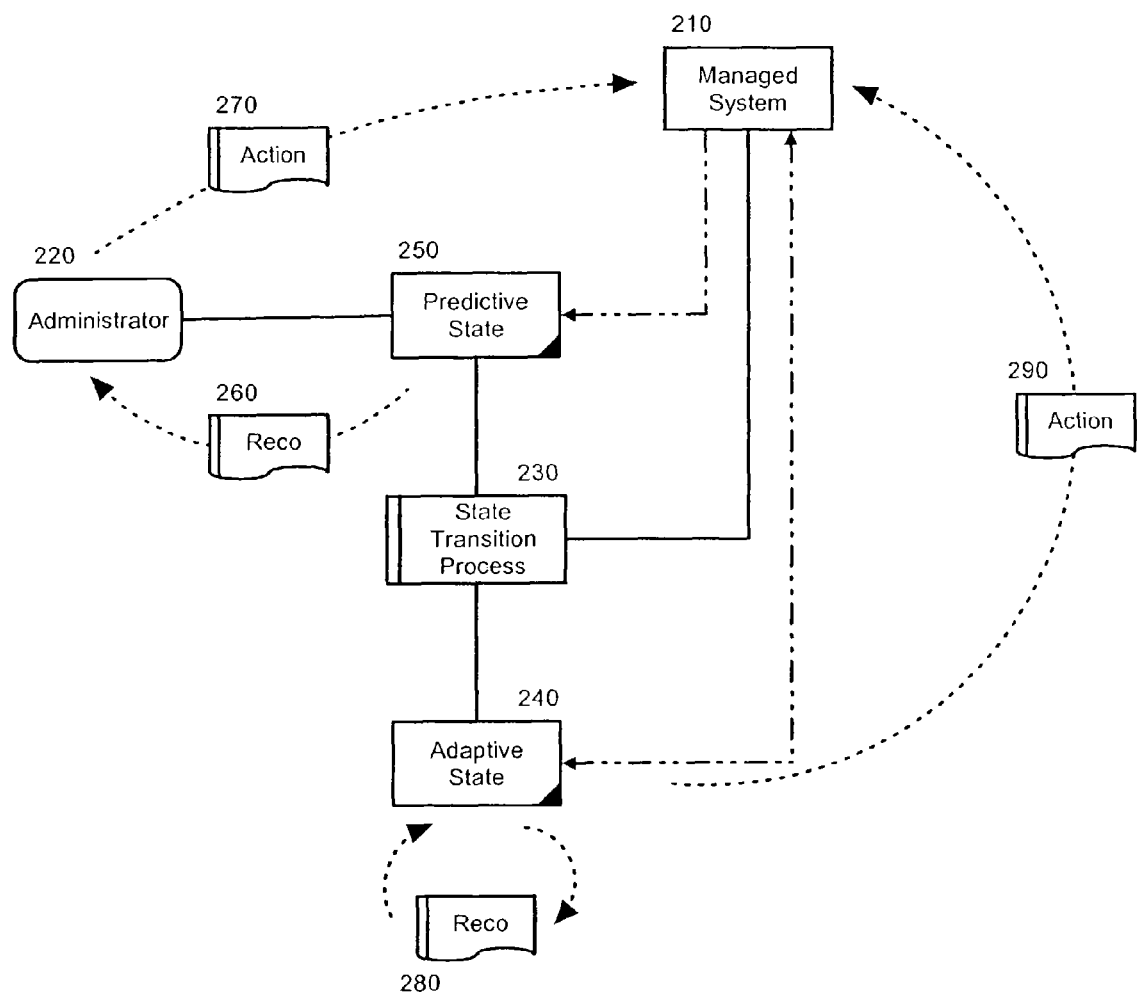
FIG. 2 is a schematic illustration of a system which has been configured for autonomic transitioning from a predictive to an adaptive management state in accordance with the inventive arrangements.

FIG. 2 is a schematic illustration of a system which has been configured for autonomic transitioning from a predictive to an adaptive management state in accordance with the inventive arrangements. The system can include a managed system 210 which can be managed by one or more authorized administrators 220. The operation of the managed system 210 can be monitored by a predictive management process 250 and an adaptive management process 230.

Based upon the monitoring of the managed system 210, the predictive management process 250 and the adaptive management process 240 can recommend suitable management courses of action. In the case of the predictive management process 250, the recommendations 260 can be forward to the administrator 220 responsive to which the administrator 220 optionally can heed the recommendation 260 and issue a corresponding action 270 in the management of the managed system 210. In contrast, the adaptive management process 240 can utilize its own recommendations 280 to automatically perform a corresponding action 290 in the management of the managed system 210.

Importantly, a state transition processor 230 can monitor the performance of both the predictive management process 250 and the adaptive management process 240. Where a certain level of trust has been built in respect to the accurate recommendations of the predictive management process 250, the state transition processor 230 can automatically transition the management of the managed system 210 from the ultimate manual control of the administrator 220 to the autonomic control Of the adaptive management process 240. Conversely, when a certain level of distrust has been built in respect to the inaccurate recommendations of the adaptive management process 240, the state transition processor 230 can automatically transition the management of the managed system 210 from the ultimate autonomic control of the adaptive management process 240 to the manual control of the administrator 220.

Figure 3A:
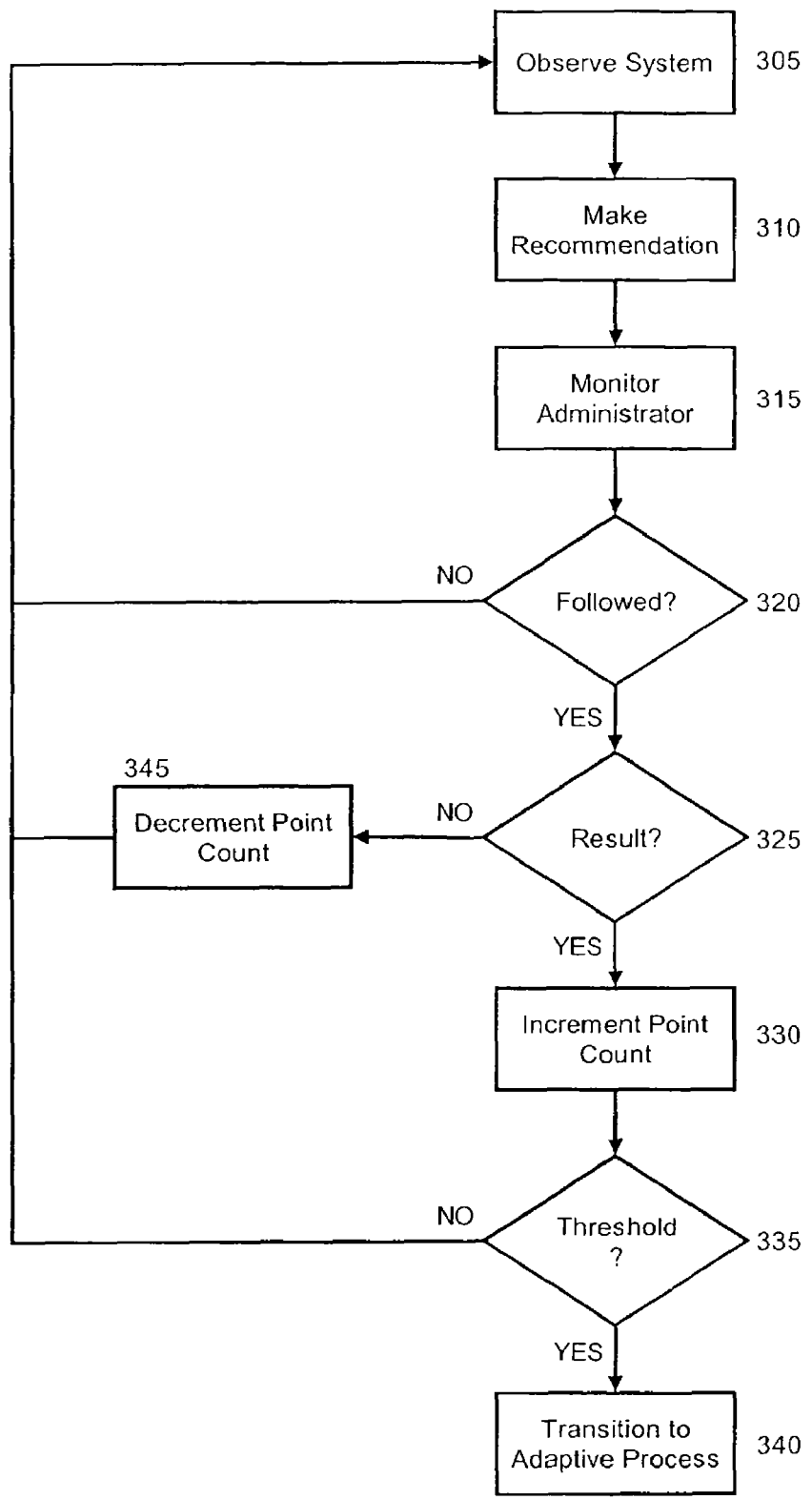
FIG. 3A is a flowchart illustrating a process for managing a system element in the predictive state of FIG. 2; and, FIG. 3B is a flow chart illustrating a process for managing a system element in the adaptive state of FIG. 2.

FIG. 3A is a flow chart illustrating a process for managing a system element in the predictive state of FIG. 2. Beginning in block 305, the managed system can be observed. Based upon the state and operation of the managed system, in block 310, a recommendation can be formulated and forwarded to an administrator. The administrator can follow the recommendation by manually performing an action which comports with the recommendation, or the administrator can ignore or otherwise discount the recommendation by not manually performing an action which comports with the recommendation. In either case, the actions of the administrator can be monitored in block 315.

If in decision block 320, if it is determined that the administrator did not follow the recommendation of the predictive management process, the method can return to block 305. Otherwise, if it is determined that the administrator has followed the recommendation of the predictive management process, in decision block 325 it can be determined whether the recommended action or actions of the administrator had an effect consummate with the prediction of the predictive management process. If so, an indicator reflecting a level of trust of decision making by the predictive management process, for instance, a "point count", can be incremented. More specifically, each time the administrator successfully follows the recommendation of the predictive management process, the instance can be tracked so as to build a history of trustworthiness of the predictive management process In contrast, each time the result of the administrator's having followed the recommendation of the predictive management process does not comport with the prediction of the predictive management process, the instance can be tracked so as to limit the history of trustworthiness. Optionally, points can also be subtracted when an administrator does not follow the recommendation.

In decision block 335, if the incremented point count exceeds a predetermined threshold, in block 340 the system can transition to an adaptive management process, the requisite level of trustworthiness of the predictive capabilities of the autonomic system having satisfied the reservations of the administrator. Otherwise, the method can return through block 305. Notably, the threshold can be pre-established to indicate a requisite level of trustworthiness preferred by an administrator. The requisite level can range from loose trustworthiness to perpetual distrust. In the case of perpetual distrust, a sufficiently high threshold value can ensure that the adaptive management process never assumes control of the management of the managed system. In either case, the threshold can be pre-established for each action, for each class of action, or for each type of managed system.

Figure 3B:
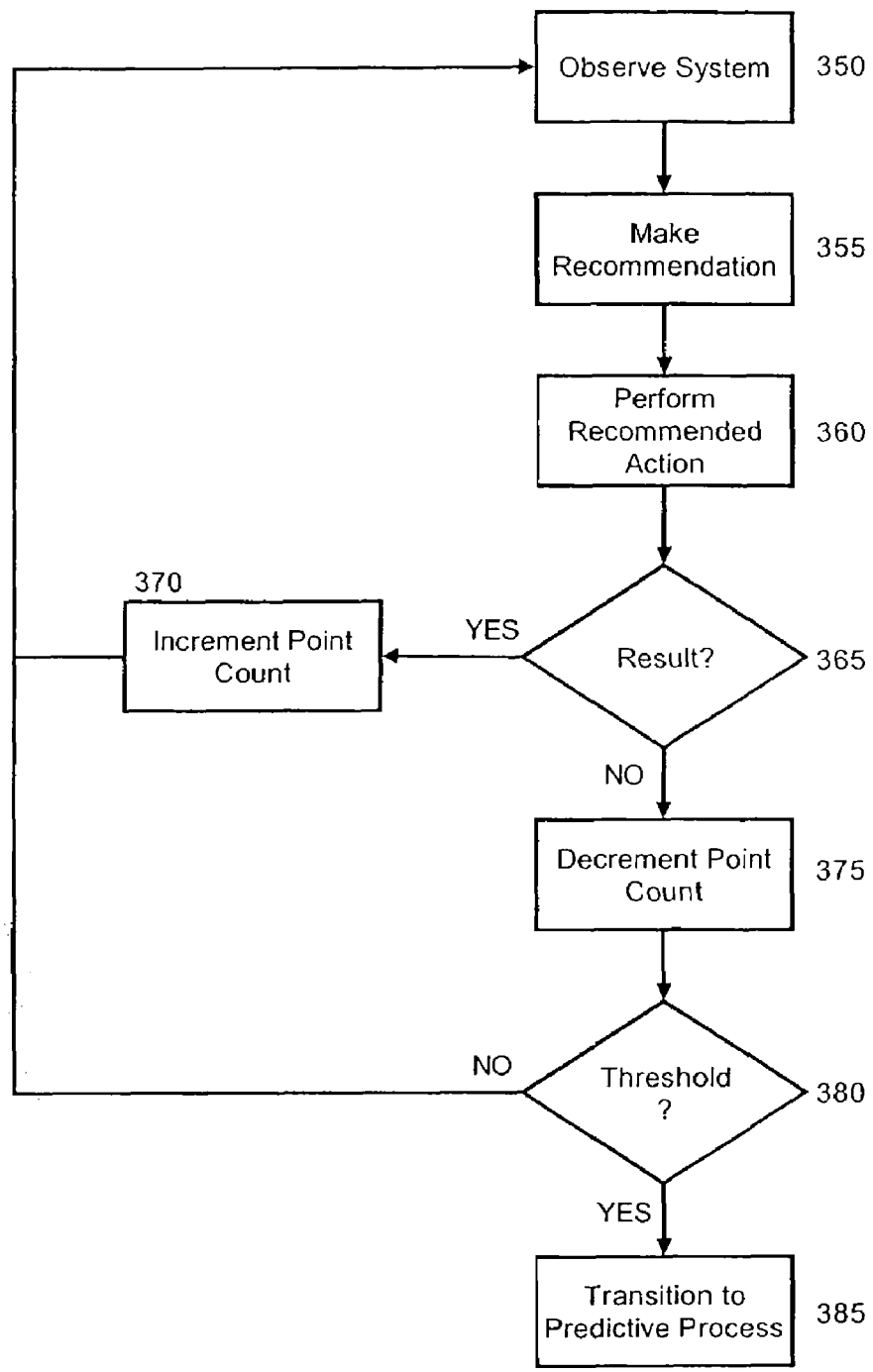

FIG. 3B is a flow chart illustrating a process for managing a system element in the adaptive management process of FIG. 2. The autonomic state of the adaptive management process can be reached through a requisite number of successful predictions of behavior in the managed system by the predictive state. Once in the autonomic state, in block 350 the managed system once again can be observed. Responsive to events occurring within and without the managed system, in block 355 the adaptive management process can set forth a recommended course of action. Subsequently, in block 360 the adaptive management process can perform the recommended course of action.

In decision block 365, it can be determined whether the actions of the adaptive management process had an, effect consummate with the prediction of the adaptive management process. If so, in block 370 the point count can be incremented further enhancing the trusting sentiment of the administrator. Subsequently, the process can return to block 350. Otherwise, when the result of the action undertaken by the adaptive management process fails to comport with the prediction of the adaptive management process, in block 375 the point count can be decremented thereby indicating a lower level of trustworthiness arising from the mistaken prediction of the adaptive management process.

In decision block 380, if the decremented point count falls below the predetermined threshold, in block 385 the system can transition back to the predictive management process, the requisite level of trustworthiness of the predictive capabilities of the autonomic system having not satisfied the requirements of the administrator. In this case, the administrator can be notified of the impending transition. Otherwise, the method can return through block 350. Importantly, as a hysteresis condition can arise from point values proximate to the threshold, a smoothing function can be applied to point values proximate to the threshold. As an example, a trend which exceeds or falls below the threshold can be required before undertaking a transition. Additionally, certain actions can be forbidden to give rise to a transition, and other actions can be enumerated and excluded from the autonomic management, always remaining under explicit administrator control.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for the autonomic management of autonomic systems, the method comprising the steps of:

monitoring a managed system and recommending a course of action to be performed in said managed system;

determining whether said recommended course of action has been performed by an administrator and responsive to said determination, further determining whether an outcome from said course of action comports with a predicted outcome;

changing a point count responsive to a further determination that said outcome from said course of action comports with said predicted outcome, and oppositely changing said point count responsive to a further determination that said outcome from said course of action does not comport with said predicted outcome; and, when said point count crosses a threshold value, transitioning management of said managed system to an adaptive component.

2. The method of claim 1, further comprising the step of when said point count re-crosses said threshold value in a direction opposite a direction which gave rise to said transitioning step, returning management of said managed system to a predictive component.

3. The method of claim 2, further comprising the step of requesting permission from an administrator prior to returning management of said managed system to said predictive component.

4. The method of claim 1, wherein said transitioning step comprises the steps of:

detecting a crossing of said threshold value in a changing of said point count;

smoothing changes in said point count; and, permitting said transition step only after said step of smoothing changes.

5. The method of claim 1, further comprising the step of forbidding a transition to said adaptive component by setting said threshold value to a de facto infinite value.

6. A machine readable storage having stored thereon a computer program for the autonomic management of autonomic systems, the computer program comprising a routine set of instructions for causing the machine to perform the steps of:

monitoring a managed system and recommending a course of action to be performed in said managed system;

determining whether said recommended course of action has been performed by an administrator and responsive to said determination, further determining whether an outcome from said course of action comports with a predicted outcome;

changing a point count responsive to a further determination that said outcome from said course of action comports with said predicted outcome, and oppositely changing said point count responsive to a further determination that said outcome from said course of action does not comport with said predicted outcome; and, when said point count crosses a threshold value, transitioning management of said managed system to an adaptive component.

7. The machine readable storage of claim 6, further comprising the step of when said point count re-crosses said threshold value in a direction opposite a direction which gave rise to said transitioning step, returning management of said managed system to a predictive component.

8. The machine readable storage of claim 7, further comprising the step of requesting permission from an administrator prior to returning management of said managed system to said predictive component.

9. The machine readable storage of claim 6, wherein said transitioning step comprises the steps of:

detecting a crossing of said threshold value in a changing of said point count;

smoothing changes in said point count; and, permitting said transition step only after said step of smoothing changes.

10. The machine readable storage of claim 6, further comprising the step of forbidding a transition to said adaptive component by setting said threshold value to a de facto infinite value.

* * * * *